United States Patent
Kim et al.

(10) Patent No.: US 9,971,180 B2
(45) Date of Patent: May 15, 2018

(54) LIQUID CRYSTAL DISPLAY HAVING IMPROVED ALIGNMENT LAYER DRYING CHARACTERISTICS

(71) Applicant: SAMSUNG DISPLAY CO., LTD., Yongin-si, Gyeonggi-do (KR)

(72) Inventors: Si Kwang Kim, Daegu (KR); Seung-Yeon Chae, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days. days.

(21) Appl. No.: 15/271,524

(22) Filed: Sep. 21, 2016

(65) Prior Publication Data
US 2017/0146845 A1    May 25, 2017

(30) Foreign Application Priority Data
Nov. 19, 2015   (KR) .................. 10-2015-0162604

(51) Int. Cl.
*G02F 1/1333*   (2006.01)
*G02F 1/1337*   (2006.01)

(52) U.S. Cl.
CPC ...... *G02F 1/133377* (2013.01); *G02F 1/1337* (2013.01)

(58) Field of Classification Search
CPC ................................ G02F 1/133377
See application file for complete search history.

(56) References Cited

U.S. PATENT DOCUMENTS

| 2003/0038912 A1* | 2/2003 | Broer ............ C09K 19/00 349/122 |
| 2014/0267966 A1* | 9/2014 | Won ............. G02F 1/133377 349/42 |

FOREIGN PATENT DOCUMENTS

| KR | 10-2014-0025081 A | 3/2014 |
| KR | 10-2015-0066977 A | 6/2015 |

\* cited by examiner

*Primary Examiner* — Wen-Ying P Chen
(74) *Attorney, Agent, or Firm* — Innovation Counsel, LLP

(57) ABSTRACT

A liquid crystal display according to an exemplary embodiment of the present invention includes a substrate, a roof layer facing the substrate and shaped so as to at least partially define a plurality of microcavities, a liquid crystal layer disposed in the plurality of microcavities, and a partition wall which partitions adjacent ones of the microcavities and which includes at least two regions having different heights from each other.

18 Claims, 12 Drawing Sheets

LIQUID CRYSTAL DISPLAY HAVING IMPROVED ALIGNMENT LAYER DRYING CHARACTERISTICS

CROSS-REFERENCE TO RELATED APPLICATION

This application claims priority to, and the benefit of, Korean Patent Application No. 10-2015-0162604 filed in the Korean Intellectual Property Office on Nov. 19, 2015, the entire contents of which are incorporated herein by reference.

BACKGROUND (a) Technical Field

Embodiments of the present disclosure relate generally to liquid crystal displays. More specifically, embodiments of the present disclosure relate to liquid crystal displays having improved alignment layer drying characteristics.

(b) Description of the Related Art

The commonly-found liquid crystal display typically consists of a pair of substrates and a liquid crystal layer interposed between the substrates.

By applying voltage to an electrode formed on a display panel including the substrates, an electric filed is generated in the liquid crystal layer. The alignment of the liquid crystal molecules of the liquid crystal layer is determined under the influence of the generated electric field, so as to display images by controlling the polarization of incident light.

One type of liquid crystal display employs a plurality of microcavities, where a liquid crystal material is injected into the plurality of microcavities, thereby forming the liquid crystal layer. A conventional liquid crystal display employs two substrates, but this technology forms constituent elements on one substrate, which enables a reduction in weight, thickness, etc., thereof.

However, the manufacturing process for such microcavity liquid crystal displays includes the steps of injecting an alignment material into the plurality of microcavities, and then drying the alignment material before liquid crystal is injected. In the process of drying the alignment material, a phenomenon in which the dried alignment material is agglomerated occurs, thus a light leakage phenomenon, a transmittance-deteriorating phenomenon, etc., is generated.

The above information disclosed in this Background section is only to enhance the understanding of the background of the disclosure and therefore it may contain information that does not form the prior art that is already known in this country to a person of ordinary skill in the art.

SUMMARY

The present disclosure provides a liquid crystal display having reduced accumulation of an alignment material in undesired locations.

An exemplary embodiment of the present invention provides a liquid crystal display including: a substrate; a roof layer on the substrate and shaped so as to at least partially define a plurality of microcavities; a liquid crystal layer which includes liquid crystal molecules disposed in the plurality of microcavities; and a partition wall which partitions adjacent ones of the microcavities and which includes at least two regions having different heights from each other.

The liquid crystal display may further include a blocking layer which is disposed at one side of the partition wall, and the blocking layer may be a part of the partition wall.

A plurality of openings may be disposed between adjacent ones of the roof layers, the blocking layer may be disposed within the openings and proximate to gaps between adjacent roof layers, and a stepped portion may be disposed within the openings.

The liquid crystal display may further include a pillar proximate to the blocking layer.

The pillar may extend from the roof layer.

The liquid crystal display may further include a capping layer disposed on the roof layer, wherein the capping layer may cover the openings.

The blocking layer may protrude toward the opening.

A height of an upper surface of the blocking layer may be the same as that of an upper surface of the roof layer.

A plurality of openings may be disposed between adjacent ones of the roof layers, the liquid crystal display may further include a pillar which extends from the roof layer to at least one of the openings, and a height of one portion of the partition wall proximate to the pillar may be greater than that of another portion of the partition wall.

The pillar may include a same material as the roof layer.

The partition wall may include a same material as the roof layer.

The liquid crystal display may further include a first electrode and a second electrode disposed between the substrate and the liquid crystal layer; and an interlayer insulating layer disposed between the first and second electrodes.

The second electrode may include a plurality of branched electrodes.

The roof layer may include at least one inorganic layer.

The liquid crystal display may further include a thin film transistor disposed on the substrate, a gate line connected with the thin film transistor, and a data line crossing the gate line, wherein the partition wall may be disposed along a direction in which the data line extends.

A plurality of openings may be disposed between adjacent ones of the roof layers and each the openings may extend along a direction in which the gate line extends.

and proximate to gaps between adjacent roof layers a capping layer disposed on the roof layers.

The liquid crystal display may further include a blocking layer disposed proximate to one side of the partition wall and a stepped portion disposed proximate to another side of the partition wall.

The capping layer may cover the stepped portion.

The plurality of openings may be disposed between adjacent ones of the roof layers, the blocking layer may be disposed within the openings and proximate to gaps between adjacent roof layers, the stepped portion may be disposed within the openings, and the stepped portion may have the same height as the openings.

According to an exemplary embodiment of the present invention, since the alignment material is dried independently in each microcavity, agglomeration of the alignment material in the microcavity does not increase. Therefore, light leakage may be prevented.

DETAILED DESCRIPTION OF THE EMBODIMENTS

Figure 1:
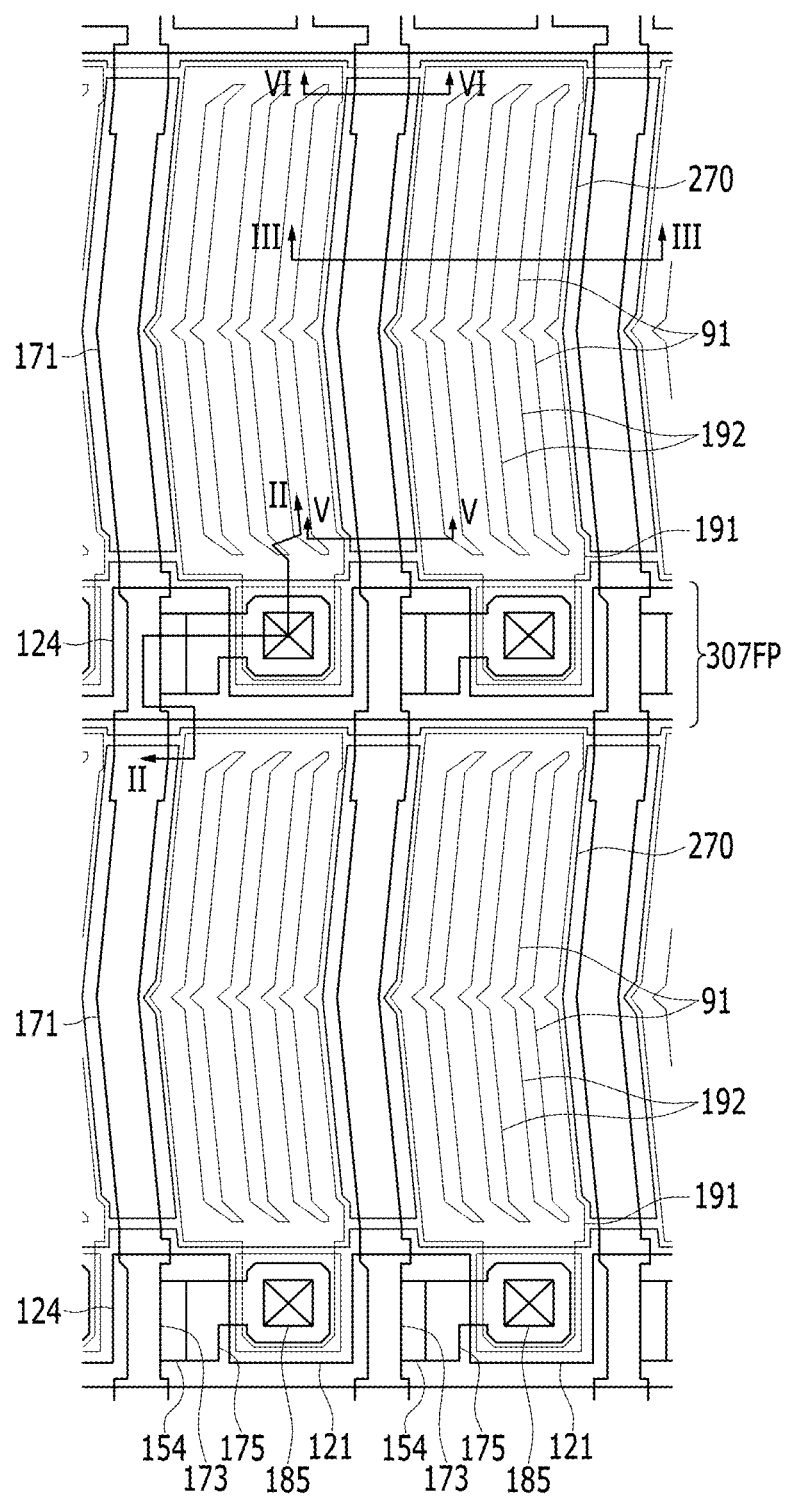
FIG. 1 is a top plan view of a liquid crystal display according to an exemplary embodiment of the present invention.

The present disclosure will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Parts that are irrelevant to the description will be omitted in order to clearly describe the present disclosure, and the same or similar constituent elements will be designated by the same reference numerals throughout the specification.

Further, in the drawings, the size and thickness of each element are arbitrarily illustrated for ease of description, and the present disclosure is not necessarily limited to those illustrated in the drawings. In the drawings, the thickness of layers, films, panels, regions, etc., are exaggerated for clarity. In the drawings, for ease of description, the thicknesses of some layers and regions are exaggerated. Accordingly, the various drawings may not be to scale.

In addition, it will be understood that when an element such as a layer, film, region, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

All numerical values are approximate, and may vary. All examples of specific materials and compositions are to be taken as nonlimiting and exemplary only. Other suitable materials and compositions may be used instead.

FIG. 1 is a top plan view of a liquid crystal display according to an exemplary embodiment of the present invention.

Figure 2:
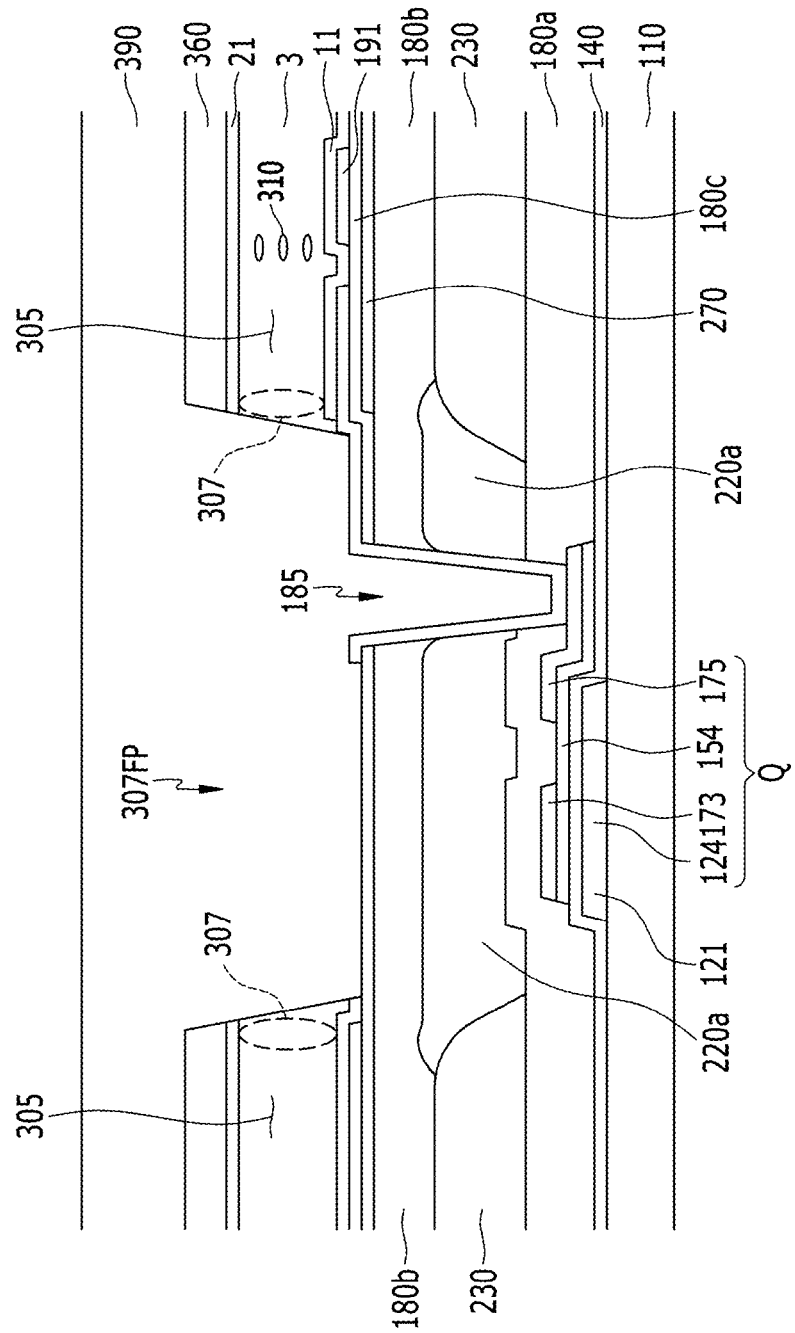
FIG. 2 is a cross-sectional view of FIG. 1 taken along line II-II.

FIG. 2 is a cross-sectional view of FIG. 1 taken along line II-II.

Figure 3:
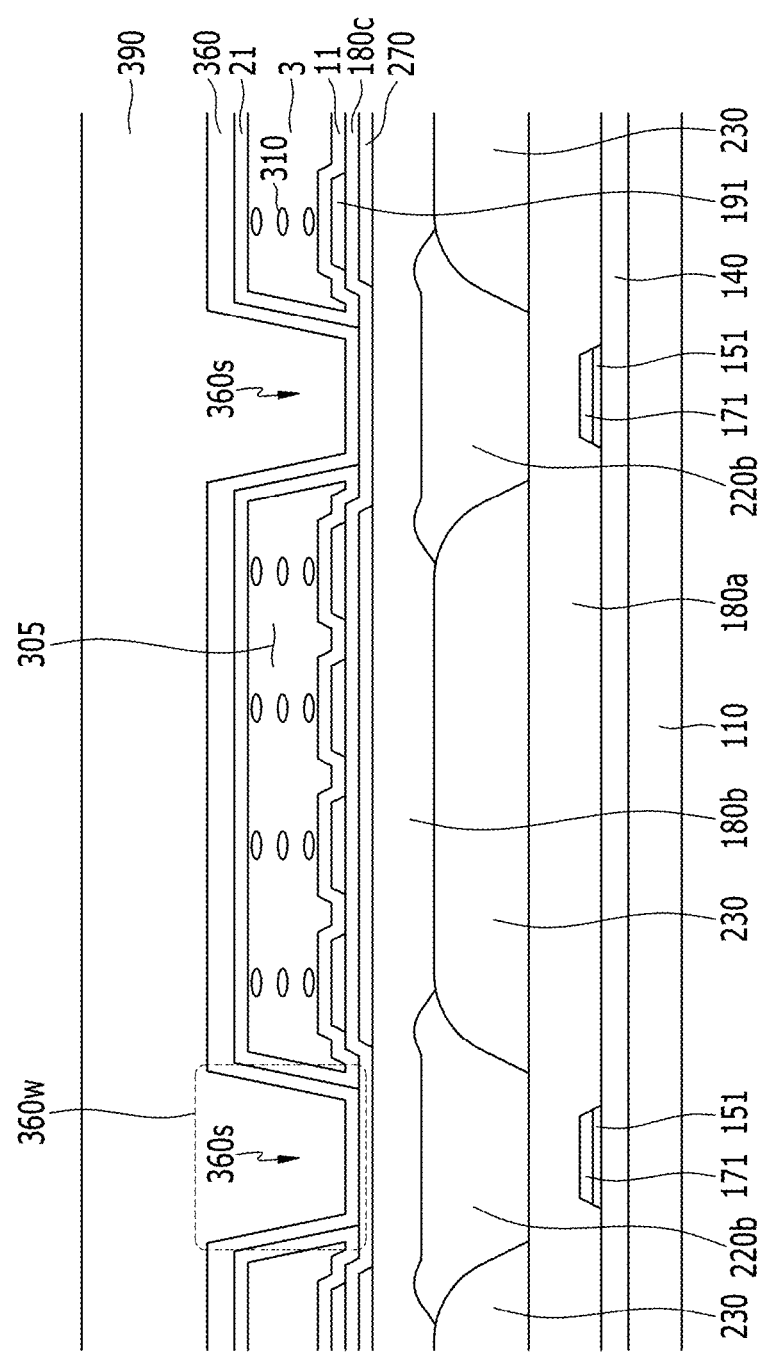
FIG. 3 is a cross-sectional view of FIG. 1 taken along line III-III.

FIG. 3 is a cross-sectional view of FIG. 1 taken along line III-III.

Figure 4:
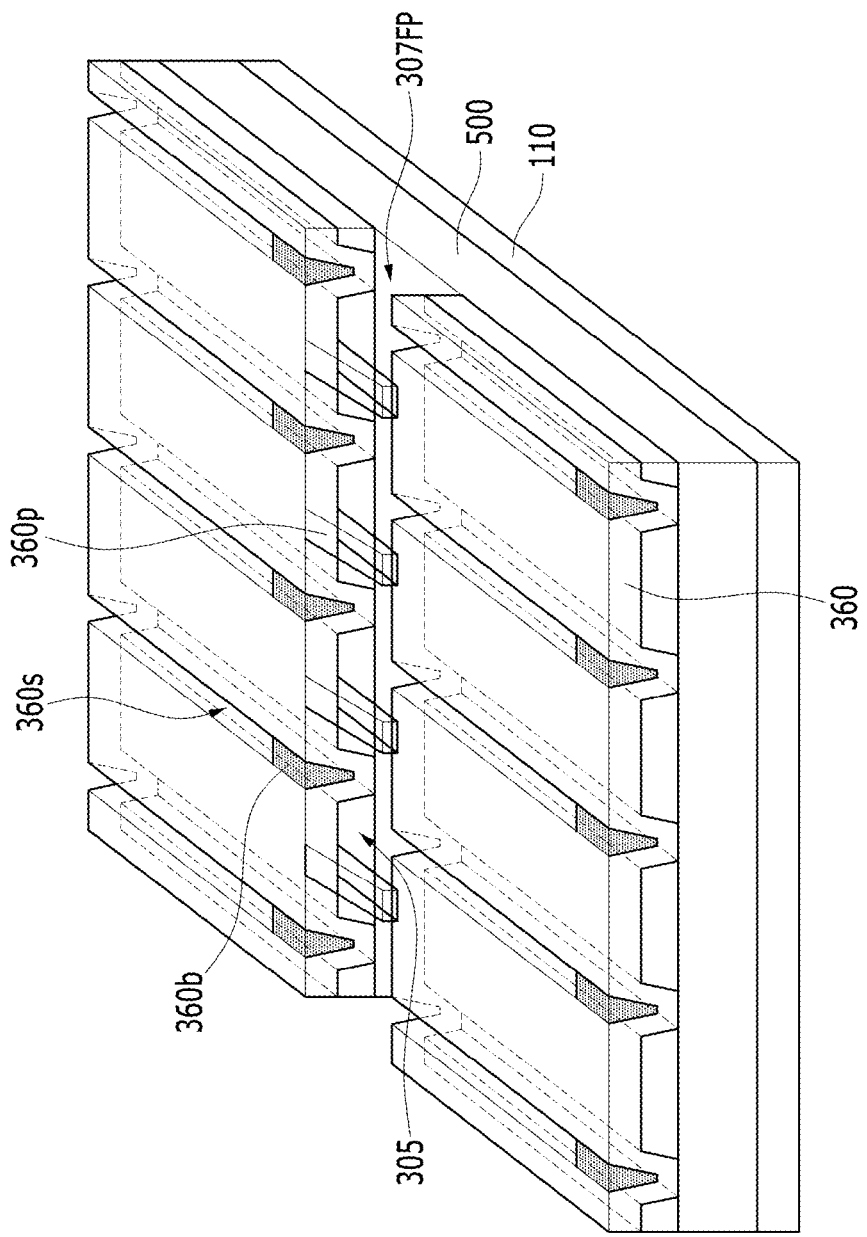
FIG. 4 is a schematic perspective view showing the shapes of a roof layer and a partition wall in a liquid crystal display according to an exemplary embodiment of FIG. 1 to FIG. 3.

FIG. 4 is a schematic perspective view showing the shapes of a roof layer and a partition wall in a liquid crystal display according to an exemplary embodiment of FIG. 1 to FIG. 3.

Figure 5:
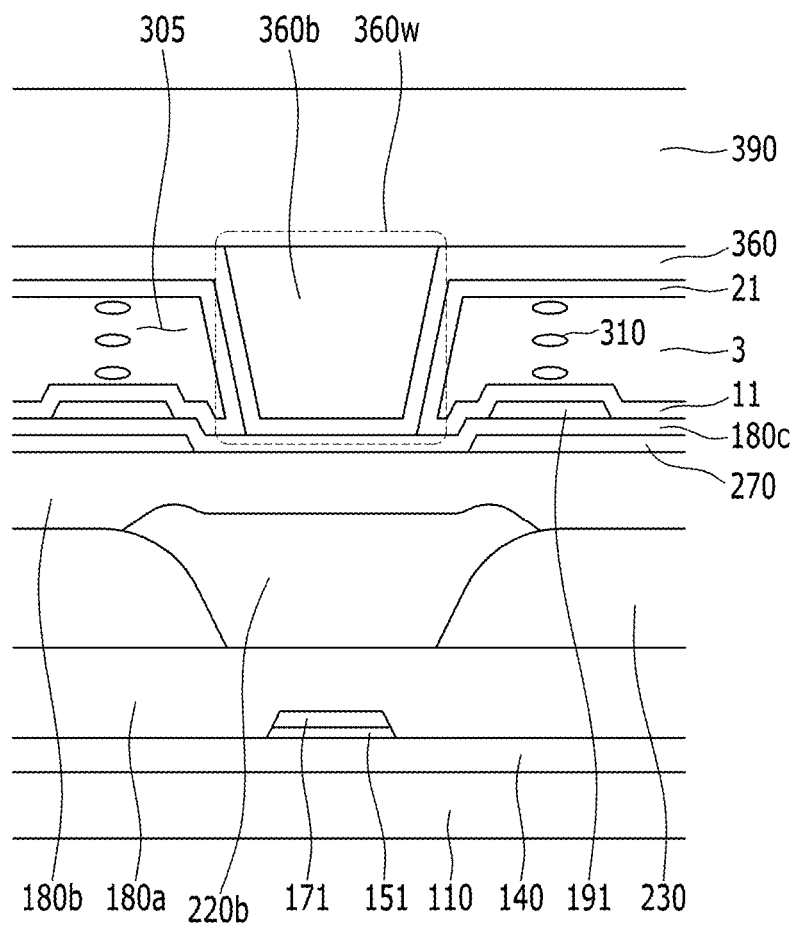
FIG. 5 is a cross-sectional view of FIG. 1 taken along line V-V.

FIG. 5 is a cross-sectional view of FIG. 1 taken along line V-V.

Figure 6:
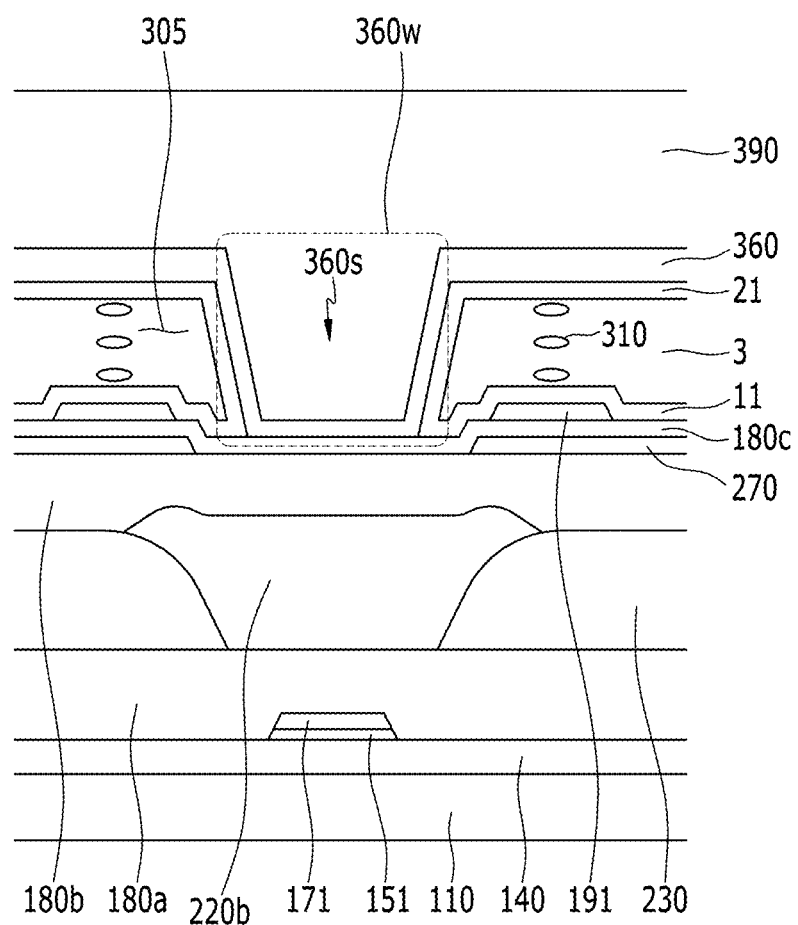
FIG. 6 is a cross-sectional view of FIG. 1 taken along line VI-VI.

FIG. 6 is a cross-sectional view of FIG. 1 taken along line VI-VI.

Referring to FIG. 1 to FIG. 3, a gate line 121 is disposed on a substrate 110 made of transparent glass or plastic, etc. The gate line 121 includes a gate electrode 124, and a wide end portion (not shown) for connection with another layer or an external driving circuit. The gate line 121 may made of aluminum-based metals such as aluminum (Al) or an aluminum alloy, silver-based metals such as silver (Ag) or a silver alloy, copper-based metals such as copper (Cu) or a copper alloy, molybdenum-based metals such as molybdenum (Mo) or a molybdenum alloy, chromium (Cr), tantalum (Ta), and titanium (Ti). However, the gate line 121 may have a multilayer structure including at least two conductive layers having different physical properties.

A gate insulating layer 140 is disposed on the gate line 121, and the gate insulating layer 140 is made of a silicon nitride (SiNx), a silicon oxide (SiOx), etc. The gate insulating layer 140 may have a multilayer structure including at least two insulating layers having different physical properties. A semiconductor layer 151 disposed at a lower portion of a data line 171, and a semiconductor layer 154 disposed at lower portions of source and drain electrodes 173 and 175 and a channel portion of a thin film transistor (Q) described later, are disposed on the gate insulating layer 140. The semiconductor layer 154 may be made of amorphous silicon or polysilicon, or an oxide semiconductor.

A plurality of ohmic contacts may be formed between the semiconductor layers 151 and 154 and the data line 171, and between the semiconductor layers 151 and 154 and the source and drain electrodes 173 and 175. These ohmic contacts are omitted in the drawings.

The data conductors 171, 173, and 175 are formed on the semiconductor layers 151 and 154 and the gate insulating layer 140. The data conductors include the source electrode 173, the data line 171 connected to the source electrode 173, and the drain electrode 175. The data line 171 may include another layer or a wide end (not shown) for connection with an external driving circuit.

The data line 171 transmits a data signal, and mainly crosses the gate line 121 so as to extend in a vertical direction.

The source electrode 173 is a part of the data line 171 and is disposed on the same layer as the data line 171 to extend therefrom. The drain electrode 175 is formed to extend in parallel with the source electrode 173. Accordingly, the drain electrode 175 is parallel to a part of the data line 171. The structure of such source electrode 173 and drain electrode 175 may be modified.

A thin film transistor Q is formed by the gate electrode 124, the source electrode 173, and the drain electrode 175 together with the semiconductor layer 154, and a channel of the thin film transistor Q is formed at the semiconductor layer between the source electrode 173 and the drain electrode 175.

The data line 171 and the drain electrode 175 are preferably made of a refractory metal such as copper, molybdenum, chromium, tantalum, and titanium, or any alloys thereof, and may have a multilayer structure with a refractory metal layer (not shown) and a low-resistance conductive layer (not shown).

A first protective layer 180a is formed on portions of the data conductor 171, 173, and 175 and the exposed semiconductor layer 154. The first protective layer 180a may include an inorganic insulator such as a silicon nitride (SiNx) and a silicon oxide (SiOx), or an organic insulator.

A color filter 230 and light blocking members 220a and 220b are formed on the first protective layer 180a.

The light blocking members 220a and 220b have a lattice structure with openings corresponding to a region which displays an image, and are formed of a material that is not capable of transmitting light. The color filter 230 is formed at the openings of the light blocking members 220a and 220b. The light blocking members 220a and 220b include a horizontal light blocking member 220a which is formed in a direction parallel to the gate line 121, and a vertical light blocking member 220b which is formed in a direction parallel to the data line 171. However, the structure of the light blocking members 220a and 220b may be modified. For instance, the vertical light blocking member 220b may be omitted, and the data line 171 may instead function as the light blocking member. In addition, the horizontal light blocking member 220a may form a pixel electrode 191 described hereinafter, and may be disposed on the pixel electrode 191.

The color filter 230 may display one of three primary colors such as red, green, or blue. However, it is not limited to the three primary colors of red, green, and blue, and may for instance represent one of cyan, magenta, yellow, and white-based colors. The color filter 230 may be formed of materials for displaying different colors for different pixels.

A second protective layer 180b is formed to cover the color filter 230 and the light blocking members 220a and 220b. The second protective layer 180b may include an inorganic insulator such as a silicon nitride (SiNx) and a silicon oxide (SiOx), or an organic insulator. Contrary to the illustration in the cross-sectional view of FIG. 2, in a case where a step is generated due to a difference in thickness between the color filter 230 and the light blocking members 220a and 220b, the second protective layer 180b may include an organic insulator to thereby reduce or eliminate the step.

The color filter 230, the light blocking members 220a and 220b, and the protective layers 180a and 180b are formed with contact openings 185 exposing the drain electrode 175.

A common electrode 270 is disposed on the second protective layer 180b. The common electrode 270 may be formed as a substantially planar structure covering the entire surface of the substrate 110, and may have openings in regions corresponding to the horizontal light blocking members 220a including the vicinity of the drain electrode 175. That is, the common electrode 270 may cover most of the pixels, excluding the areas between pixels.

Portions of common electrode 270 which are disposed at adjacent pixels may be connected to each other, and may thus receive the same common voltage that is supplied from an external source.

An interlayer insulating layer 180c is disposed on the common electrode 270. The interlayer insulating layer 180c may consist of an organic insulating material, an inorganic insulating material, etc.

The pixel electrode 191 is disposed on the interlayer insulating layer 180c. The pixel electrode 191 may be made of transparent conductive materials, such as ITO, IZO, etc. The pixel electrode 191 may have a plurality of cutouts 91, and a plurality of branched electrodes 192 which are disposed between neighboring cutouts.

The first protective layer 180a, the second protective layer 180b, and the interlayer insulating layer 180c are formed with a contact opening 185 therein which exposes the drain electrode 175. The pixel electrode 191 is physically and electrically connected to the drain electrode 175 through the contact opening 185, and thus receives a voltage from the drain electrode 175.

The common electrode 270 is a first field generating electrode or a first electrode, and the pixel electrode 191 is a second field generating electrode or a second electrode. The pixel electrode 191 and the common electrode 270 may form a horizontal electric field and a vertical electric field. The pixel electrode 191 and the common electrode 270 together generate an electric field, and thus liquid crystal molecules 310 therebetween are induced to rotate in a direction parallel or perpendicular to the direction of the electric field. Depending on the thus-determined rotation direction of the liquid crystal molecules, polarization of light passing through the liquid crystal layer varies. The common electrode 270 may made of a transparent conductive material such as ITO, IZO, etc.

According to a liquid crystal display of the illustrated exemplary embodiment, even though the common electrode 270 has a platelike or planar (flat) shape, and the pixel electrode 191 has a plurality of branched electrodes 192, they are not limited to these configurations. Instead, for example, the pixel electrode 191 may have a plate of a planar shape, and the common electrode 270 may have a plurality of branched electrodes in the liquid crystal display according to a modified exemplary embodiment of the present invention.

A lower alignment layer 11 is formed on the pixel electrode 191, and may determine an initial alignment direction with a photo-alignment method by including a photo-alignment material.

An upper alignment layer 21 is disposed at a portion facing the lower alignment layer 11, within microcavity 305. A liquid crystal layer 3 is disposed in the microcavity 305 according to the present exemplary embodiment, and includes liquid crystal molecules 310. A portion which corresponds to an inlet 307 is disposed at two opposing lateral sides of the microcavity 305. The inlet 307 is covered with a capping layer 390 described later, and forms the inlet into which the alignment material and the liquid crystal material are injected, such as by capillary pressure, in the manufacturing process.

The microcavities 305 may be formed along a column direction of the pixel electrode 191, i.e., a vertical direction thereof. A plurality of openings 307FP which are covered by the capping layer 390 are formed between a plurality of roof layers 360 described later. The capping layer 390 which covers the openings 307FP may enable the microcavities 305 adjacent to each other in the vertical direction thereof to be divided.

A portion at which each of the plurality of microcavities 305 are disposed may correspond to one or two or more pixel areas, where "pixel area" may refer to a minimum unit that may represent a color contrast.

The roof layer 360 is disposed on the upper alignment layer 21. The roof layer 360 may be an inorganic insulating layer which is formed with the inorganic material such as a silicon oxide (SiOX) or a silicon nitride (SiNx). The roof layer 360 may be formed by deposition of two or more kinds of inorganic layers (not shown).

The roof layer 360 serves to support the structure of the microcavity 305 so that the microcavity 305 can retain its shape and not be crushed or otherwise deformed. The roof layers 360 may be disposed over the entire area of the substrate, excluding the opening 307FP.

The capping layer 390 is disposed on the roof layers 360. The capping layer 390 includes an organic material or an inorganic material. Specifically, the capping layer 390 may be formed of a thermosetting resin, a silicon oxycarbide (SiOC), a graphene, etc. The capping layer 390 of the present exemplary embodiment may contact the upper surface of the roof layer 360. The capping layer 390 may cover the openings 307FP as well as the top of the roof layer 360. In this case, the capping layer 390 may cover the inlet 307 of the microcavity 305 exposed by the opening 307FP, and may be deposited after the liquid crystal material is injected thereto. In the present exemplary embodiment, it is illustrated that the liquid crystal material is removed from the opening 307FP, but it is at times possible for some liquid crystal material to remain in the area of opening 307FP after injection into the microcavity 305.

In the present exemplary embodiment, a partition wall 360w is formed between the liquid crystal layers 3 disposed in the microcavities 305 adjacent to each other in the horizontal direction, as shown in FIG. 3. The partition wall 360w partitions the microcavities 305 that are adjacent to each other in the direction in which the gate line 121 extends. The partition wall 360w is formed by both an extension of the roof layer 360 (referred to as a stepped portion 360s) and a portion of the capping layer 390, and the partition wall 360w may be formed along the direction in which the data line 171 extends.

The partition wall 360w according to the present exemplary embodiment may have at least two regions of different height. For example, the partition wall 360w includes the stepped portion 360s and a blocking layer 360b. A portion of the partition wall 360w in which the blocking layer 360b is formed is higher than that of the partition wall 360w in which the stepped portion 360s is formed. That is, a blocking layer 360b may be formed in portions of the partition wall 360w.

Referring to FIG. 4, a thin film transistor panel 500 is disposed on the substrate 110, and the thin film transistor panel 500 includes a thin film transistor, a color filter, a light blocking member, the pixel electrode, etc., that are described above. The blocking layer 360b has an upper portion which is placed at substantially the same level as the roof layer 360 and which is disposed at one side of the partition wall 360w, as well as a stepped portion 360s having a groove extending below the highest elevation of the roof layer 360. The stepped portion 360s takes up the remainder of partition wall 360w outside the blocking layer 360b. In the present exemplary embodiment, the blocking layer 360b is formed at one side of the partition wall 360w, and the stepped portion 360s is located along the remainder of partition wall 360w.

The liquid crystal display according to the present exemplary embodiment also includes a pillar 360p which is formed at the opening 307FP adjacent to the blocking layer 360b. In the present exemplary embodiment, the pillar 360p may be a portion that extends from one side of the roof layer 360 adjacent to the blocking layer 360b. The pillar 360p determines the direction of drying while drying the alignment material. In particular, drying may proceed toward the pillar 360p.

Referring to FIG. 1, FIG. 4, and FIG. 5, the blocking layer 360b is formed at one side of the partition wall 360w, and the upper surface of the blocking layer 360b is disposed at substantially the same level as the upper surface of the roof layer 360.

Referring to FIG. 1, FIG. 4, and FIG. 6, the stepped portion 360s is formed at the other side of the partition wall 360w, and the height difference between the upper surface of opening 307FP and the stepped portion 360s is small. Therefore, in a liquid crystal display according to an exemplary embodiment of the present disclosure, the stepped portion 360s may induce flow of an alignment material solution toward the opening 307FP, even though a spotted defect occurs during the injection process of the alignment material.

Figure 7:
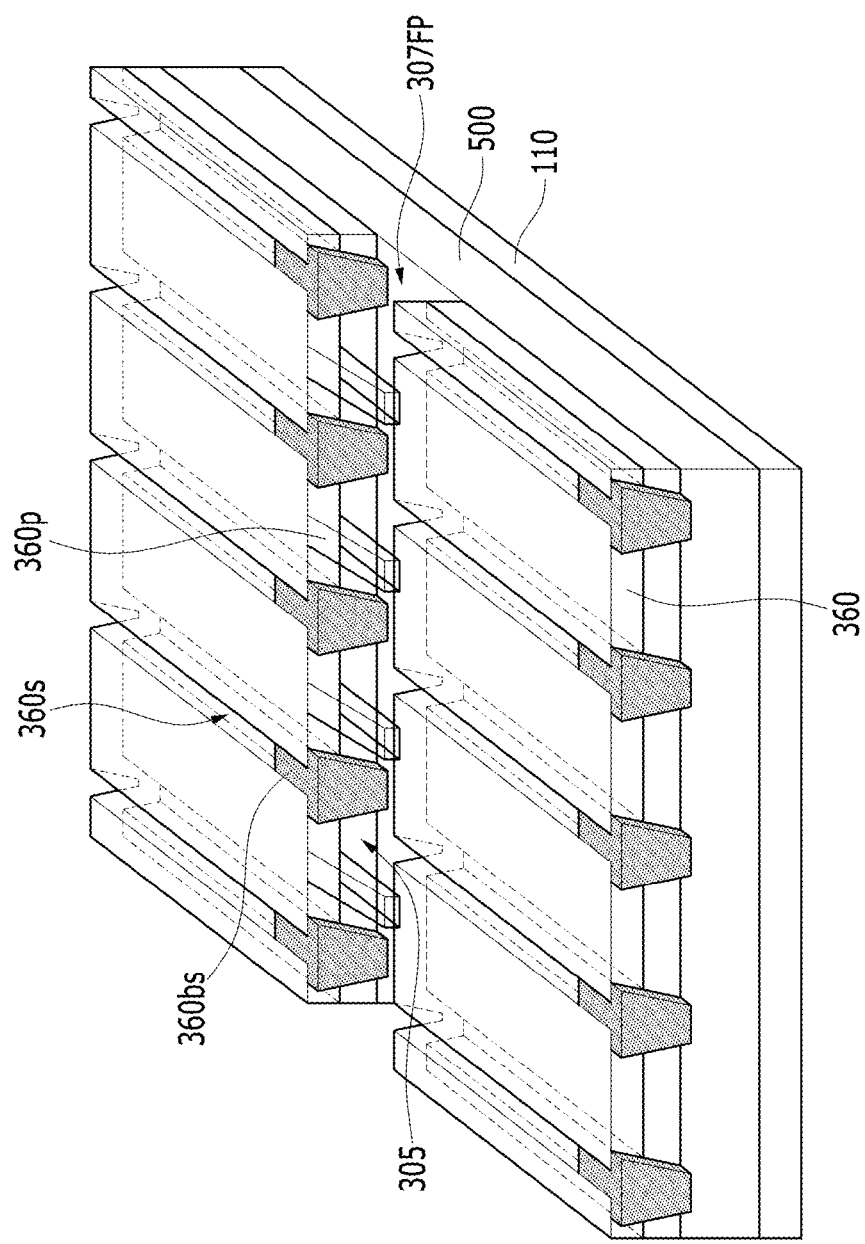
FIG. 7 is a perspective view of a modified exemplary embodiment of a liquid crystal display of FIG. 4.

FIG. 7 is a perspective view of a modified exemplary embodiment of the liquid crystal display of FIG. 4.

The exemplary embodiment Illustrated in FIG. 7 is mostly the same as the exemplary embodiment of FIG. 4, excepting a difference in the structure of a blocking layer 360bs. The blocking layer 360bs according to the present exemplary embodiment protrudes toward or into the opening 307FP. In addition to the above-described difference, the remaining description regarding the exemplary embodiment of FIG. 4 may be applied to the present exemplary embodiment.

Figure 8:
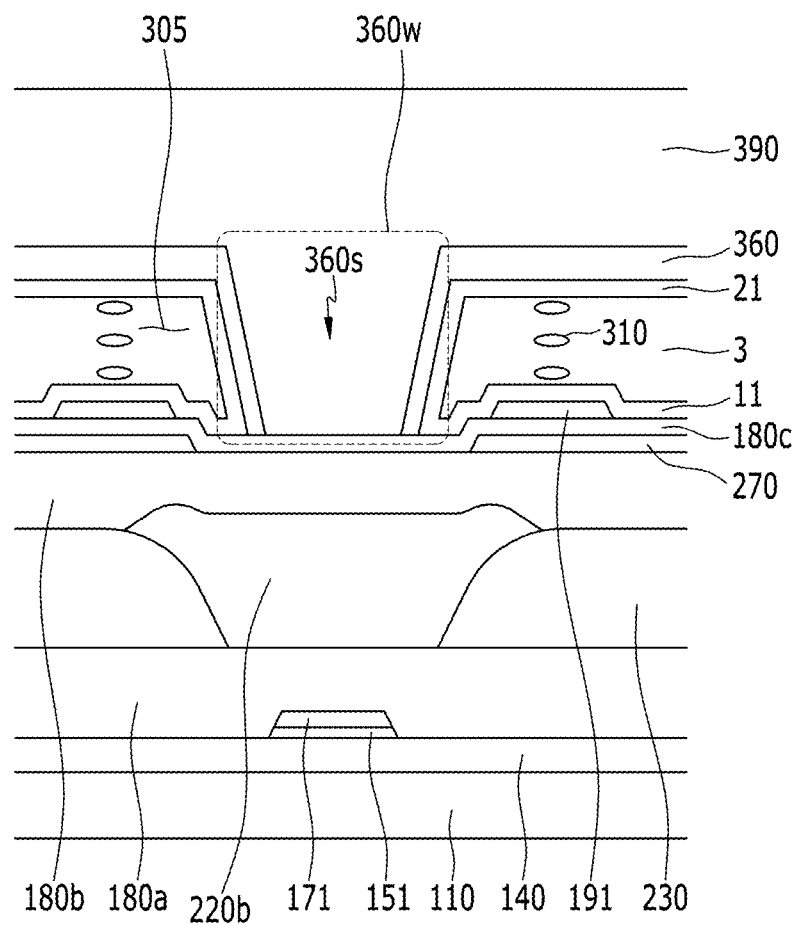
FIG. 8 is a cross-sectional view of a modified exemplary embodiment of a liquid crystal display of FIG. 6.

FIG. 8 is a cross-sectional view of a modified exemplary embodiment of the liquid crystal display of FIG. 6.

The exemplary embodiment illustrated in FIG. 8 is mostly the same as the exemplary embodiment of FIG. 6, excepting a difference in the structure of the partition wall 360w. The partition wall 360w of the present exemplary embodiment may allow the stepped portion 360s to have substantially the same depth, or elevation from substrate 110, as the opening 307FP. The roof layer 360 may be separated from, i.e. discontinuous in, the stepped portion 360s. That is, the roof layer 360 may have a gap extending along the bottom of the stepped portion 360s. In addition to the above-described difference, the remaining description regarding the exemplary embodiment of FIG. 6 may be applied to the present exemplary embodiment.

Figure 9:
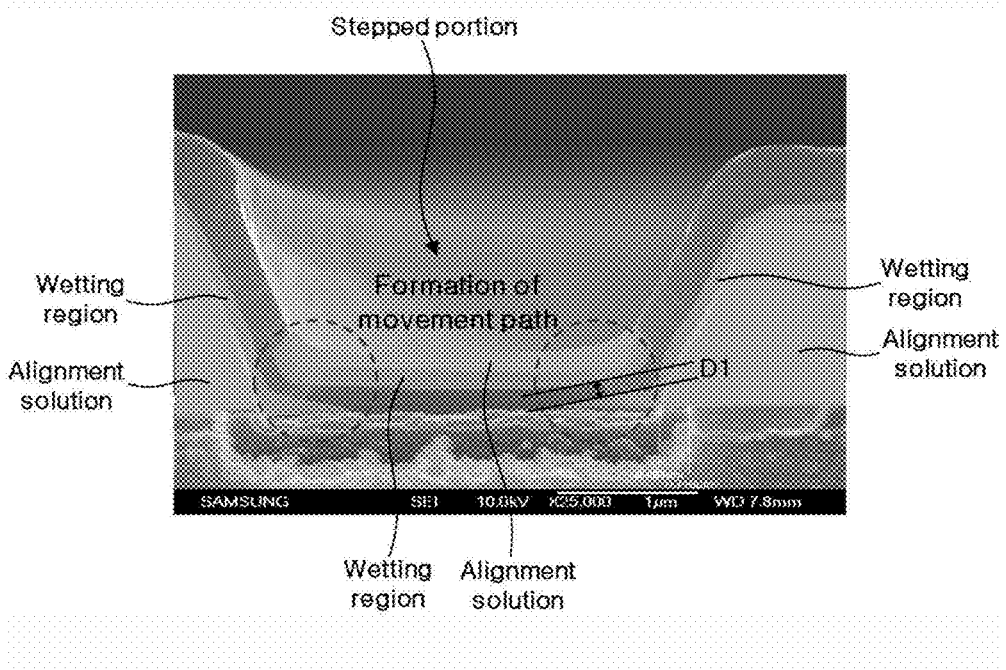
FIG. 9 is a photograph showing the formation of a movement path of an alignment solution in a conventional liquid crystal display.

FIG. 9 is a photograph showing the formation of a movement path of an alignment solution in a conventional liquid crystal display. Unlike previous embodiments, in the liquid crystal display of FIG. 9, stepped portions are formed at all portions of the partition wall. In other words, a pillar-disposed portion is a portion at which the drying of the alignment solution is finished, and FIG. 9 shows the partition wall adjacent to the portion at which the drying is finished. FIG. 9 is a photograph showing an interface of the microcavity and the opening of the roof layer and an interface of the partition wall and the opening of the roof layer.

Referring to FIG. 9, a wetting region is formed by surface energy and capillary pressure of corners in the process of drying the alignment solution. The wetting region is a portion that serves to improve spreadability of the alignment solution.

The wetting regions exist along walls of the microcavities that face their partition walls, and along the lower surfaces of the stepped portions. The alignment solution existing in the wetting regions gradually spreads and contacts the neighboring alignment solution. Accordingly, a movement path of the alignment solution of the microcavities is generated. The generated movement path may enable the alignment solution to move between the pixel areas, such that agglomeration of the alignment material may be enlarged in a certain pixel area. Accordingly, light leakage may be caused.

Figure 10:
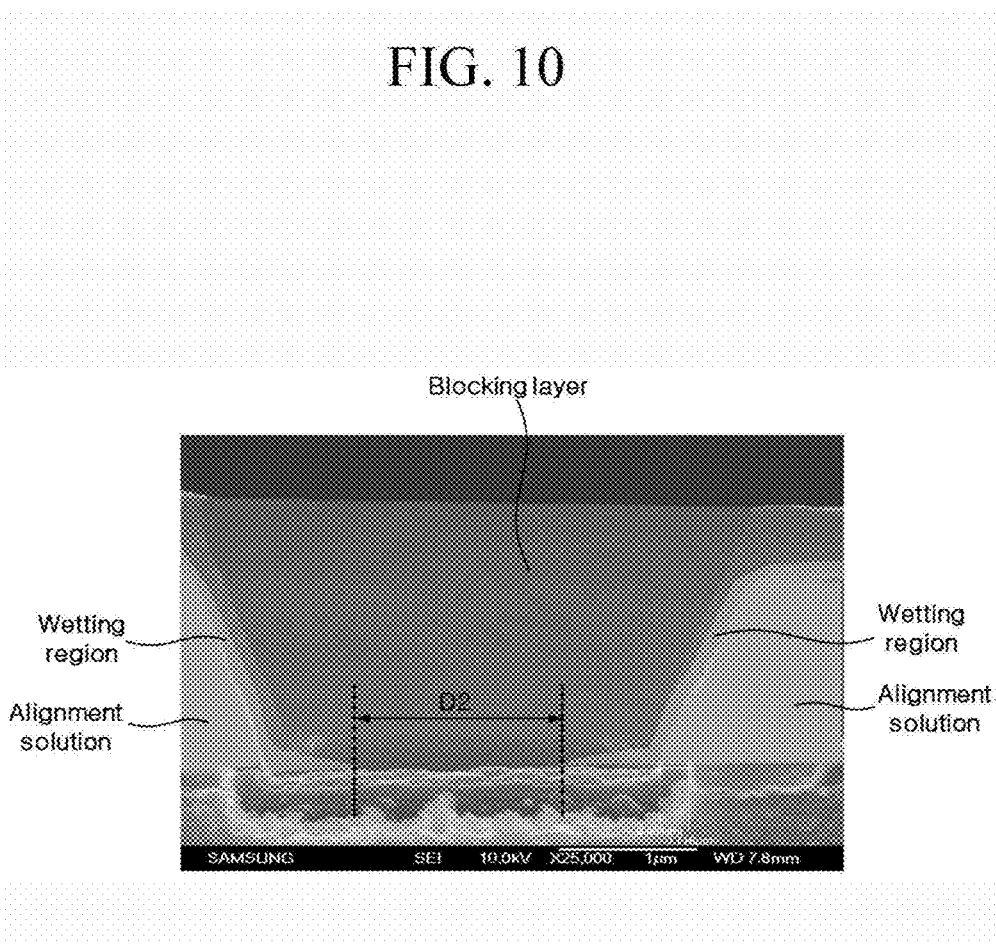
FIG. 10 is a photograph showing the separation of a wetting region in a liquid crystal display according to an exemplary embodiment of the present invention.

FIG. 10 is a photograph showing the separation of a wetting region in a liquid crystal display according to an exemplary embodiment of the present invention.

Referring to FIG. 10, a blocking layer is formed at a partition wall adjacent to the area at which drying of the alignment solution is finished. Even though there is no stepped portion due to the formation of the blocking layer, a wetting regions are formed at areas where the microcavity meets the partition wall. However, since the wetting regions are spaced apart by a second interval D2 in the present exemplary embodiment, there is no movement of the alignment solution. This is because there is no generation of the wetting region due to the blocking layer formed at the partition wall.

Figure 11:
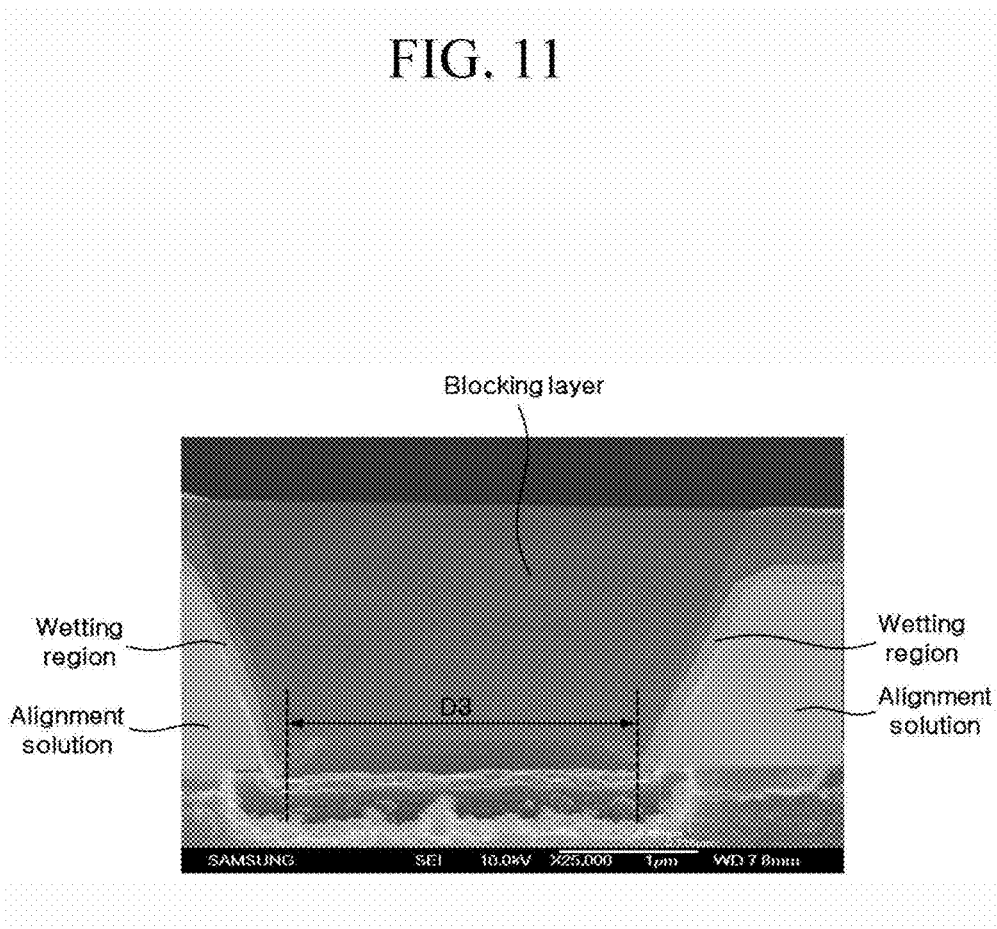
FIG. 11 is a photograph showing that a wetting region is expanded and separated in a liquid crystal display according to an exemplary embodiment of the present invention.

FIG. 11 is a photograph showing that a wetting region is expanded and separated in a liquid crystal display according to an exemplary embodiment of the present invention. In FIG. 11, in the case that the blocking layer of the partition wall according to an exemplary embodiment of the present disclosure of FIG. 7 extends to the roof layer opening, a third interval D3 between the wetting regions of microcavities adjacent to each other is larger than the second interval D2 of FIG. 10.

Figure 12:
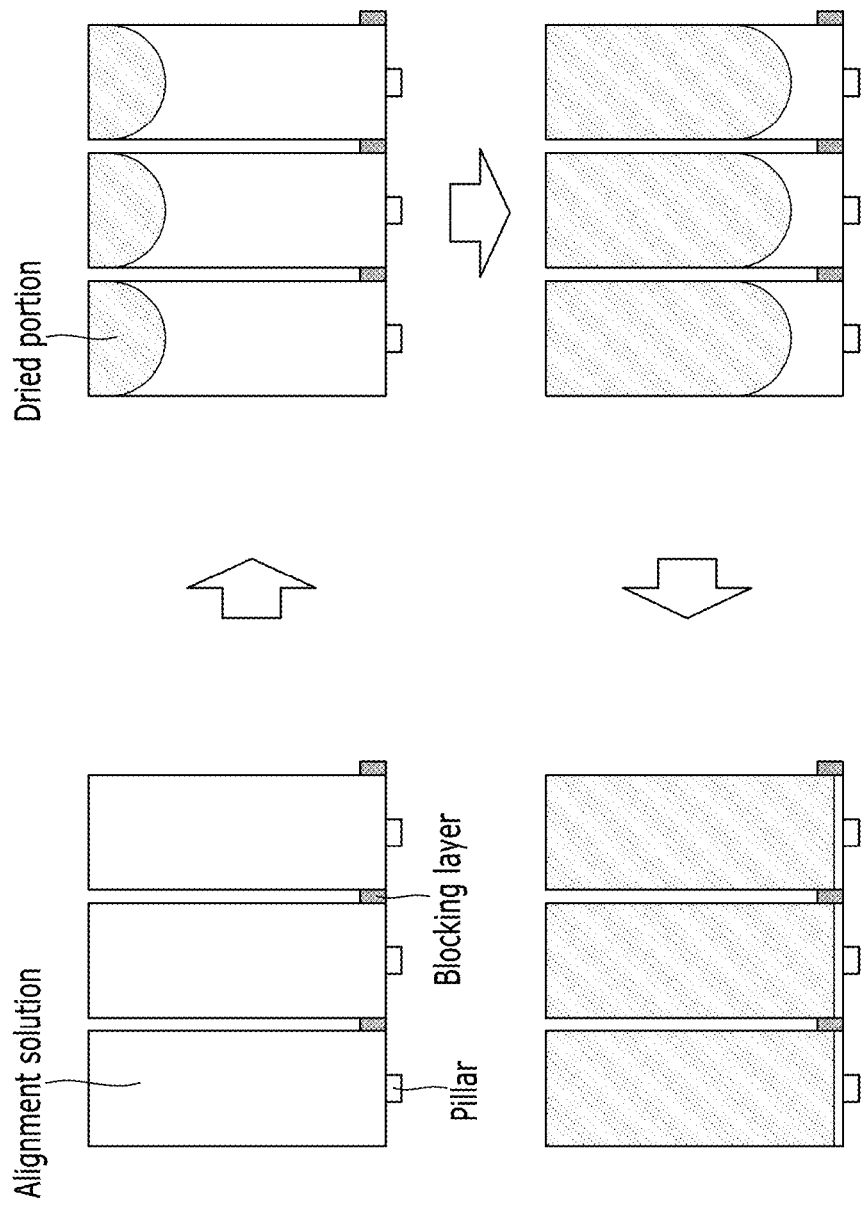
FIG. 12 is a schematic flowchart of a drying process of the alignment material in a liquid crystal display according to an exemplary embodiment of the present invention.

FIG. 12 is a schematic flowchart of a drying process of the alignment material in a liquid crystal display according to an exemplary embodiment of the present invention.

Referring to FIG. 12, when the alignment solution drops into the roof layer opening, the alignment solution is injected into the microcavity by capillary pressure. Next, drying proceeds from one side of the microcavity which is disposed opposite to the location of the pillar, to a portion where the pillar is disposed. According to the present exemplary embodiment, since the movement of the alignment solution into neighboring microcavities is prevented, drying of the alignment solution is conducted independently in each pixel area, thereby preventing excessive agglomeration of the alignment material in any one pixel area.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

<Description of symbols>

| 307 | inlet | 360 | roof layer |
|---|---|---|---|
| 360w | partition wall | 360s | stepped portion |
| 360b | blocking layer | 390 | capping layer |

What is claimed is:

1. A liquid crystal display comprising:
    a substrate;
    a plurality of roof layers disposed on the substrate and shaped so as to at least partially define a plurality of microcavities, the plurality of roof layers including a plurality of peaks and a plurality of valleys, and including a plurality of openings disposed between adjacent ones of the plurality of roof layers and exposing the plurality of microcavities;
    a liquid crystal layer comprising liquid crystal molecules disposed in the plurality of microcavities;
    a plurality of blocking layers exclusively formed in the plurality of valleys adjacent to the plurality of openings; and
    a capping layer disposed on the plurality of blocking layers, wherein a thickness of the capping layer disposed on the plurality of blocking layers is thinner than that disposed on the plurality of valleys in which the plurality of blocking layers are not disposed.

2. The liquid crystal display of claim 1, further comprising a plurality of pillars disposed proximate to the plurality of blocking layers.

3. The liquid crystal display of claim 2, wherein the plurality of pillars extends from the plurality of roof layers.

4. The liquid crystal display of claim 3, wherein the capping layer is disposed on the plurality of roof layers and covers the plurality of openings.

5. The liquid crystal display of claim 2, wherein the plurality of blocking layers protrude toward the plurality of openings.

6. The liquid crystal display of claim 1, wherein a height of an upper surface of the plurality of blocking layers is the same as that of an upper surface of the plurality of roof layers.

7. The liquid crystal display of claim 1, further comprising
    a pillar which extends from one of the plurality of roof layers into at least one of the plurality of openings,
    wherein the plurality of blocking layers and the capping layer disposed on one of the plurality of valleys form a partition wall and a height of one portion of the partition wall proximate to the pillar is greater than that of another portion of the partition wall.

8. The liquid crystal display of claim 7, wherein the pillar includes a same material as the plurality of roof layers.

9. The liquid crystal display of claim 1, wherein one of the plurality of blocking layers and the capping layer disposed on one of the plurality of valleys form a partition wall and the partition wall comprises a same material as the plurality of roof layers.

10. The liquid crystal display of claim 1, further comprising:
    a first electrode and a second electrode disposed between the substrate and the liquid crystal layer; and
    an interlayer insulating layer disposed between the first and second electrodes.

11. The liquid crystal display of claim 10, wherein the second electrode includes a plurality of branched electrodes.

12. The liquid crystal display of claim 1, wherein the plurality of roof layers include at least one inorganic layer.

13. The liquid crystal display of claim 1, further comprising:
    a thin film transistor disposed on the substrate; and
    a gate line connected to the thin film transistor and a data line crossing the gate line,
    wherein one of the plurality of blocking layers and the capping layer disposed on one of the plurality of valleys form a partition wall, and the partition wall is disposed along a direction in which the data line extends.

14. The liquid crystal display of claim 13, each of the plurality of openings extends along a direction in which the gate line extends.

15. The liquid crystal display of claim 1, wherein the capping layer is disposed on the plurality of roof layers.

16. The liquid crystal display of claim 15, further comprising a plurality of stepped portions disposed proximate to the plurality of blocking layers in the plurality of valleys.

17. The liquid crystal display of claim 16, wherein the capping layer covers the plurality of stepped portions.

18. The liquid crystal display of claim 1, further comprising a plurality of stepped portions disposed proximate to the plurality of blocking layers in the plurality of valleys, wherein the plurality of stepped portions are disposed within the plurality of openings, and the plurality of stepped portions have the same height as the plurality of openings.

* * * * *